Dec. 18, 1928.

R. A. REYNOLDS

INTERNAL COMBUSTION ENGINE

Filed March 3, 1927     2 Sheets-Sheet 2

INVENTOR.
ROBERT A. REYNOLDS
BY
ATTORNEY.

Patented Dec. 18, 1928.

1,695,823

UNITED STATES PATENT OFFICE.

ROBERT A. REYNOLDS, OF DETROIT, MICHIGAN.

INTERNAL-COMBUSTION ENGINE.

Application filed March 3, 1927. Serial No. 172,493.

This invention relates to internal combustion engines, and has for its object an improved engine which is a combined sleeve valve and two-cycle engine in which the compression of the mixture does not take place in the crank case, but between the end of the sleeve and the piston, and the end of the sleeve and the cylinder head.

It involves also a novel action in compressing an air charge at one end of the piston and a very rich mixture at the other end of the piston, and then mixing the two together. Preferably one charge, namely, the air charge is used to scavenge the products of combustion.

a designates the engine cylinder, and x the closed end sliding sleeve reciprocated by the eccentric strap y. Within this sleeve is a piston d; the piston rod e passing through the end of the sleeve is packed as at f, and connected with the cross head g, reciprocated by the connecting rod h, which in turn is coupled up with the crank pin i.

Figure 1:
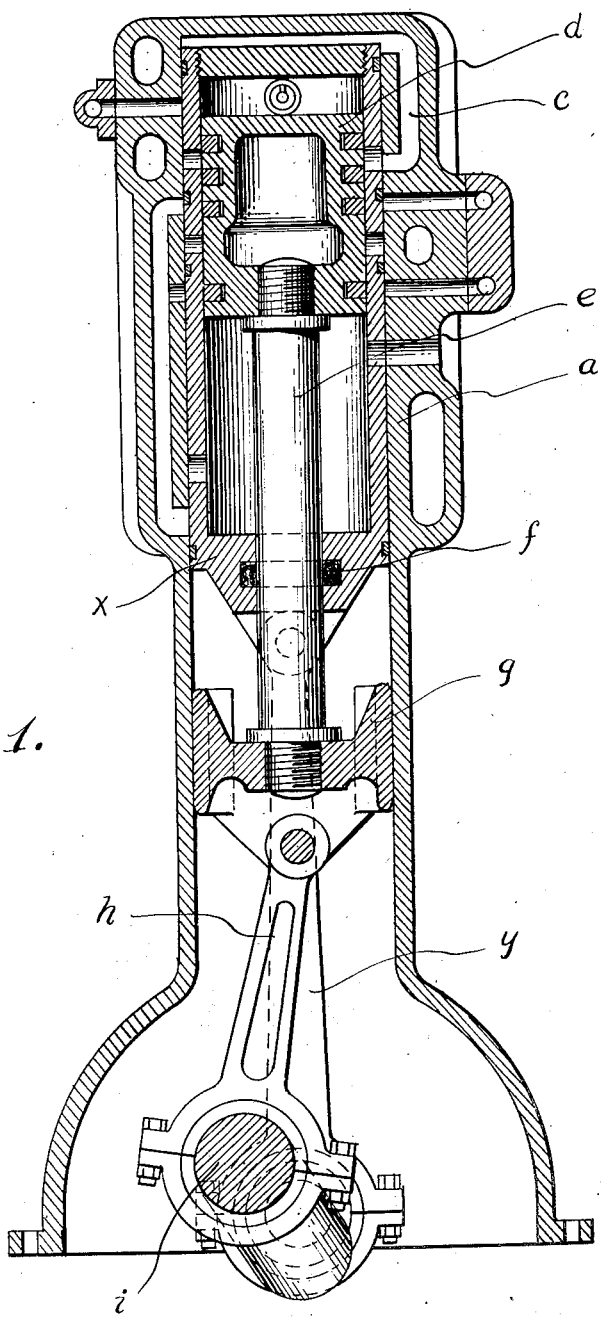
Fig. 1 is a vertical section of the engine.
Figure 2:
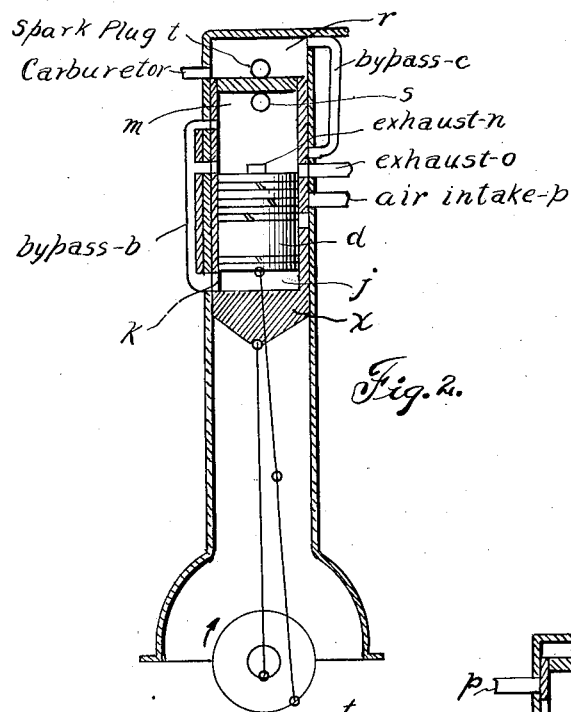
Figs. 2 and 3 are diagrammatic views, showing different engine positions of one form of the invention.
Figure 3:
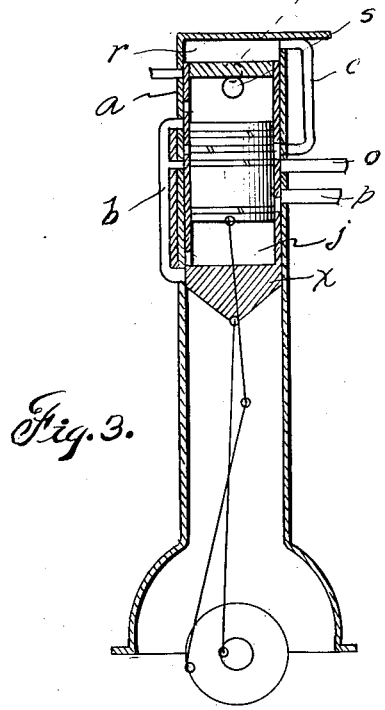

The operation will be understood by turning to the diagrammatic views. In Fig. 2 the piston is near the completion of its power stroke and its intake stroke. The carburetor is connected by one or more pipes with the space above the upper end of the sleeve x. When the sleeve and the piston go down a charge of very rich mixture is drawn from the carburetor into the compression chamber r above the end of the sleeve. This charge is preferably so rich that it would not burn in this condition. At the same time as the piston goes down, (the piston travels preferably about three times as fast as the sleeve covering, say, six inches where the sleeve moves two inches) it compresses a charge of air taken through the air intake p into the compression chamber j. As the piston reaches the bottom of its stroke, port k in the sleeve opens the by-pass b and allows the compressed air to flow through the by-pass b into the combustion chamber m. This immediately fills the combustion chamber and drives out the burnt gases through the exhaust pipes n and o. The piston then starts back, as shown in Fig. 3, and as it does so, the sleeve valve closes the by-pass b, also the exhaust, and opens up the by-pass c. This permits the rich mixture that has been drawn into the chamber r to pass into the combustion chamber and be mixed with the charge of air already there. It is compressed to a high compression by reason of the piston traveling toward the upper end of the sleeve, and at the same time the port s registers with the spark plug opening t and a spark across the gap of the plug fires the charge.

Figure 4:
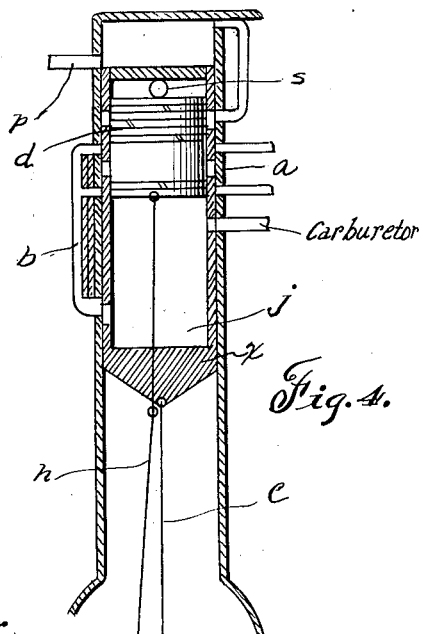
Figs. 4 and 5 are diagrammatic views, showing a modified form.
Figure 5:
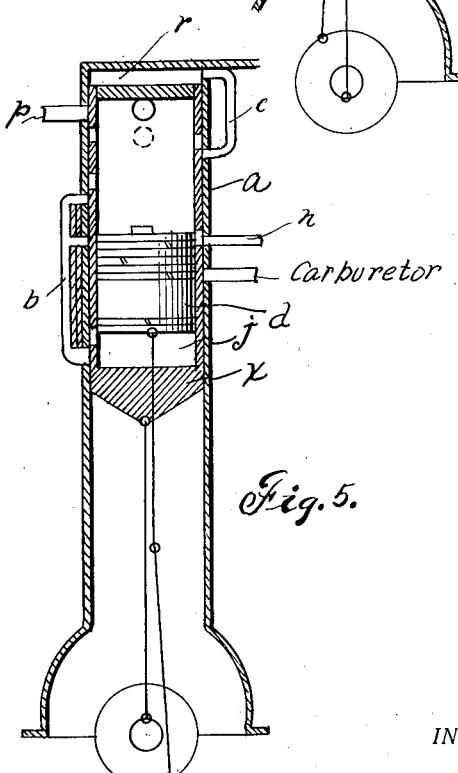

In Figs. 4 and 5 a modified form of construction is shown in which the air intake and the carburetor intake are reversed. The position of the connecting rod h and the eccentric strap y with respect to each other is different from that shown in the preceding two figures, as in Figs. 4 and 5 the connecting rod is almost 180° in advance of the eccentric strap, while in Figs. 2 and 3 the connecting rod is only slightly behind the eccentric strap. This results in a somewhat different operation. In Fig. 4 the parts are shown just at the explosion point. The explosion takes place slightly before the piston reaches the top of its travel after which the piston starts down and the sleeve upwardly, reaching the position shown in Fig. 5. In doing this the exhaust ports open up at the bottom of the piston stroke, and right after this the by-pass c is opened up to let the compressed air from the compression chamber r blow into the combustion chamber and expel the exhaust. As the sleeve now starts down it closes the exhaust ports and also the by-pass c and opens up the by-pass b which lets in the mixture from the carburetor that has been compressed in the compression chamber j. This, together with the air with which it mixes, is now again compressed in the combustion chamber, and when the piston reaches the top of its stroke and the spark plug opening is uncovered, the charge is fired.

The construction shown in Figs. 2 and 3 is the preferred construction, because here the piston and the sleeve travel together, but the piston about three times as far as the sleeve. This, of course, reduces the friction of the moving parts. In the constructions shown in Figs. 4 and 5 the piston travels in one direction when the sleeve travels in the other, and consequently this increases the relative speed of the moving parts over what would be the speed of the piston at the same number of revolutions in a cylinder without a sleeve.

I claim:

1. In an internal combustion engine, the combination of a cylinder, a closed end sleeve and piston reciprocating in the cylinder at different speeds, the cylinder and sleeve provided with ports and by-passes arranged without valve control to take in a charge of air adjacent one end of the sleeve and a charge of fuel mixture adjacent the other end of the sleeve to compress one of these charges and by-pass the same into the combustion chamber to expel the burnt gases and by-pass the other charge into the combustion chamber to mix with the first-mentioned charge, and then compress the intermingled charges, fire the same and complete a two-cycle of operation.

2. In an internal combustion engine, the combination of a cylinder, a closed end sleeve and piston reciprocating at different speeds in the cylinder, the sleeve and cylinder being provided with ports and by-passes arranged with only the piston control and the different speeds to take in a charge of air and a charge of fuel mixture, one charge being taken in between the top of the sleeve and the cylinder head and the other charge between the bottom of the piston and the inner side of the lower end of the sleeve, the two charges being compressed in these locations by relative travel of the piston with respect to the sleeve and the sleeve with respect to the cylinder head and the charge of air being introduced into the combustion chamber to expel the exhaust, and then the fuel charge being introduced into the combustion chamber to mix with the air, the intermingled charge then being compressed by relative travel of the piston with respect to the closed end sleeve, and an ignition device which is exposed and energized when the two intermingled charges are compressed together.

3. In an internal combustion engine, the combination of a cylinder, a closed end sleeve and piston reciprocating in the cylinder, the piston traveling in the same direction as the sleeve but at a relatively greater rate, the cylinder and sleeve provided with ports and by-passes with only the piston's aid for introducing a rich mixture from the carburetor between the upper end of the sleeve and the cylinder head, and an air charge between the lower end of the piston and the inside face of the lower end of the closed sleeve, and arranged to compress the air charge in this position, and by-pass the air charge into the combustion chamber to expel the exhaust gases and by-pass the fuel mixture into the combustion chamber to mix with the air and then to compress the united charges, and means for firing the same when they are compressed.

4. In an internal combustion engine, the combination of a cylinder, a closed end sleeve and piston reciprocating in the cylinder, the piston traveling in the same direction as the sleeve but at a relatively greater rate, the cylinder and sleeve provided with ports and by-passes with only the piston's aid for introducing a rich mixture from the carburetor between the upper end of the sleeve and the cylinder head, and an air charge between the lower end of the piston and the inside face of the lower end of the closed sleeve, and arranged to compress the two charges, by-pass the air charge into the combustion chamber to expel the exhaust and the fuel mixture into the combustion chamber to mix with the air, and then compress the two united charges, and means for firing the same when they are compressed.

5. In an internal combustion engine the combination of a cylinder, a closed end sleeve and piston reciprocating in the cylinder at different speeds, the cylinder and sleeve provided with ports and by-passes which are controlled entirely by the movements of the piston and sleeve and which are arranged to take in a charge of air adjacent one end of the sleeve and a charge of fuel mixture adjacent the other end of the sleeve to compress one of these charges and by-pass the same into the combustion chamber to expel the burnt gases and by-pass the other charge into the combustion chamber to mix with the first mentioned charge, and then compress the intermingled charges, fire the same and complete a two-cycle of operation.

6. In an internal combustion engine the combination of a cylinder, a closed end sleeve and piston reciprocating in the cylinder, said sleeve and piston having different lengths of reciprocating movement, the cylinder and sleeve provided with ports and by-passes arranged to take in a charge of air adjacent one end of the sleeve and a charge of fuel mixture adjacent the other end of the sleeve to compress one of these charges and by-pass the same into the combustion chamber to expel the burnt gases and by-pass the other charge into the combustion chamber to mix with the first mentioned charge, and then compress the intermingled charges, fire the same and complete a two-cycle of operation.

In testimony whereof I have affixed my signature.

ROBERT A. REYNOLDS.